United States Patent
Marlett et al.

(10) Patent No.: US 8,261,535 B2
(45) Date of Patent: Sep. 11, 2012

(54) ENHANCED POST INJECTION CONTROL SYSTEM FOR DIESEL PARTICULATE FILTERS

(75) Inventors: Chad E. Marlett, Plymouth, MI (US); Julian C. Tan, Canton, MI (US)

(73) Assignee: GM Global Technology Operations LLC

( * ) Notice: Subject to any disclaimer, the term of this patent is extended or adjusted under 35 U.S.C. 154(b) by 1620 days.

(21) Appl. No.: 11/172,416

(22) Filed: Jun. 30, 2005

(65) Prior Publication Data

US 2007/0000238 A1    Jan. 4, 2007

(51) Int. Cl.
*F01N 3/00* (2006.01)

(52) U.S. Cl. ............... 60/286; 60/274; 60/285; 60/297; 60/303

(58) Field of Classification Search .............. 60/274, 60/285, 286, 295, 297, 300, 303, 311
See application file for complete search history.

(56) References Cited

U.S. PATENT DOCUMENTS

| | | | | |
|---|---|---|---|---|
| 6,574,956 B1 * | 6/2003 | Moraal et al. | ................... | 60/295 |
| 6,698,185 B2 * | 3/2004 | Kitahara | ........................ | 60/274 |
| 6,722,122 B2 * | 4/2004 | Sealy et al. | .................... | 60/285 |
| 6,931,842 B2 * | 8/2005 | Ohtake et al. | .................... | 60/295 |
| 6,948,311 B2 * | 9/2005 | Schaller et al. | ................ | 60/286 |
| 6,959,541 B2 * | 11/2005 | Kosaka et al. | .................. | 60/295 |
| 7,013,638 B2 * | 3/2006 | Hiranuma et al. | .............. | 60/286 |
| 7,047,729 B2 * | 5/2006 | van Nieuwstadt et al. | ..... | 60/286 |
| 7,086,220 B2 * | 8/2006 | Imai et al. | ........................ | 60/274 |
| 7,237,379 B2 * | 7/2007 | Nakano et al. | .................. | 60/295 |
| 2004/0074225 A1 | 4/2004 | Schaller et al. | ................ | 60/274 |

FOREIGN PATENT DOCUMENTS

| | | | |
|---|---|---|---|
| DE | 10056016 A1 | 5/2002 | |
| EP | 1533500 A1 | 5/2005 | |

* cited by examiner

*Primary Examiner* — Thomas Denion
*Assistant Examiner* — Jesse Bogue

(57) ABSTRACT

A post injection control system for regulating diesel particulate regeneration of a diesel particulate filter (DPF) with a diesel engine includes a mass airflow sensor that generates a mass airflow signal. A temperature sensor senses the temperature of exhaust and generates an exhaust temperature signal. And a control module commands post injection at a post injection value determined from the mass airflow signal and at a post injection rate determined from the exhaust temperature signal.

17 Claims, 3 Drawing Sheets

$$TOT\_FUEL = \frac{MAF}{O_2\_MIN * AFR * CYL\_NUM * RPM * K}$$

*Figure 3*

$$Pol\_VALUE\_TRNS = TOT\_FUEL - TRQ\_FUEL - Pol\_EFF$$

*Figure 4*

$$Pol\_VALUE\_SS = DES\_Pol$$

*Figure 5*

ENHANCED POST INJECTION CONTROL SYSTEM FOR DIESEL PARTICULATE FILTERS

FIELD OF THE INVENTION

The present invention relates to diesel engines, and more particularly to diesel particulate filter (DPF) regeneration.

BACKGROUND OF THE INVENTION

Diesel engines typically have higher efficiency than gasoline engines due to an increased compression ratio and a higher energy density of diesel fuel. A diesel combustion cycle produces particulates that are typically filtered from diesel exhaust gas by a diesel particulate filter (DPF) that is disposed in the exhaust stream. Over time, the DPF becomes full and the trapped diesel particulates must be removed. During regeneration, the diesel particulates are burned within the DPF.

One regeneration approach injects fuel into a cylinder after combustion. Post-combustion injected fuel exits the engine with the exhaust gas and is combusted by diesel oxidation catalysts disposed in the exhaust stream. The heat released by the combustion in the catalysts increases the exhaust temperature, which burns the particulates in the DPF. This approach utilizes the common rail fuel injection system and does not require additional fuel injection hardware. However, if not properly controlled, this approach can cause visible white smoke and/or objectionable odor, which is known as hydrocarbon (HC) break-through.

To prevent HC break-through, the amount of fuel delivered during post injection can be controlled based on engine speed and engine load. This approach, however, fails to account for transient conditions. The control method must also be recalibrated any time the relationship of airflow and temperature to engine speed and engine load changes.

In another approach, post injection release timers are used to increase the exhaust temperature. The post injection release timers enable post injection after a pre-set time limit. However, if post injection temperature is not at an ample level and post injection occurs, HC break-through can occur. The amount of time required to heat an exhaust system is dependent upon driving conditions, ambient air temperature, and the age of the exhaust system components. As a result, the pre-set time limit approach does not account for variations in driving conditions.

SUMMARY OF THE INVENTION

Accordingly, a post injection control system for regulating diesel particulate regeneration of a diesel particulate filter (DPF) with a diesel engine includes a mass airflow sensor that generates a mass airflow signal. A temperature sensor senses the temperature of exhaust and generates an exhaust temperature signal. And a control module commands post injection at a post injection value determined from the mass airflow signal and at a post injection rate determined from the exhaust temperature signal.

In one feature, the control module determines a desired post injection value and commands post injection based on the desired post injection value if the desired post injection value is less than the post injection value.

In other features, the system includes a pre-catalyst that receives exhaust including the post injection from the diesel engine and wherein the temperature sensor senses the temperature of exhaust exiting the pre-catalyst.

In still another feature, the system includes an engine speed sensor that senses the speed of the diesel engine and wherein the post injection value is determined from the mass airflow signal, the engine speed signal, a cylinder number, a desired air/fuel ratio, a minimum oxygen value, a constant, an engine torque fuel value, and a post injection efficiency value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 illustrates an equation used in calculating a total fuel according to the present invention;

FIG. 4 illustrates an equation used in calculating a post injection value during transient engine operating conditions; and FIG. 5 illustrates an equation used in calculating a post injection value during steady state engine operating conditions.

DETAILED DESCRIPTION OF THE PREFERRED EMBODIMENTS

Figure 1:
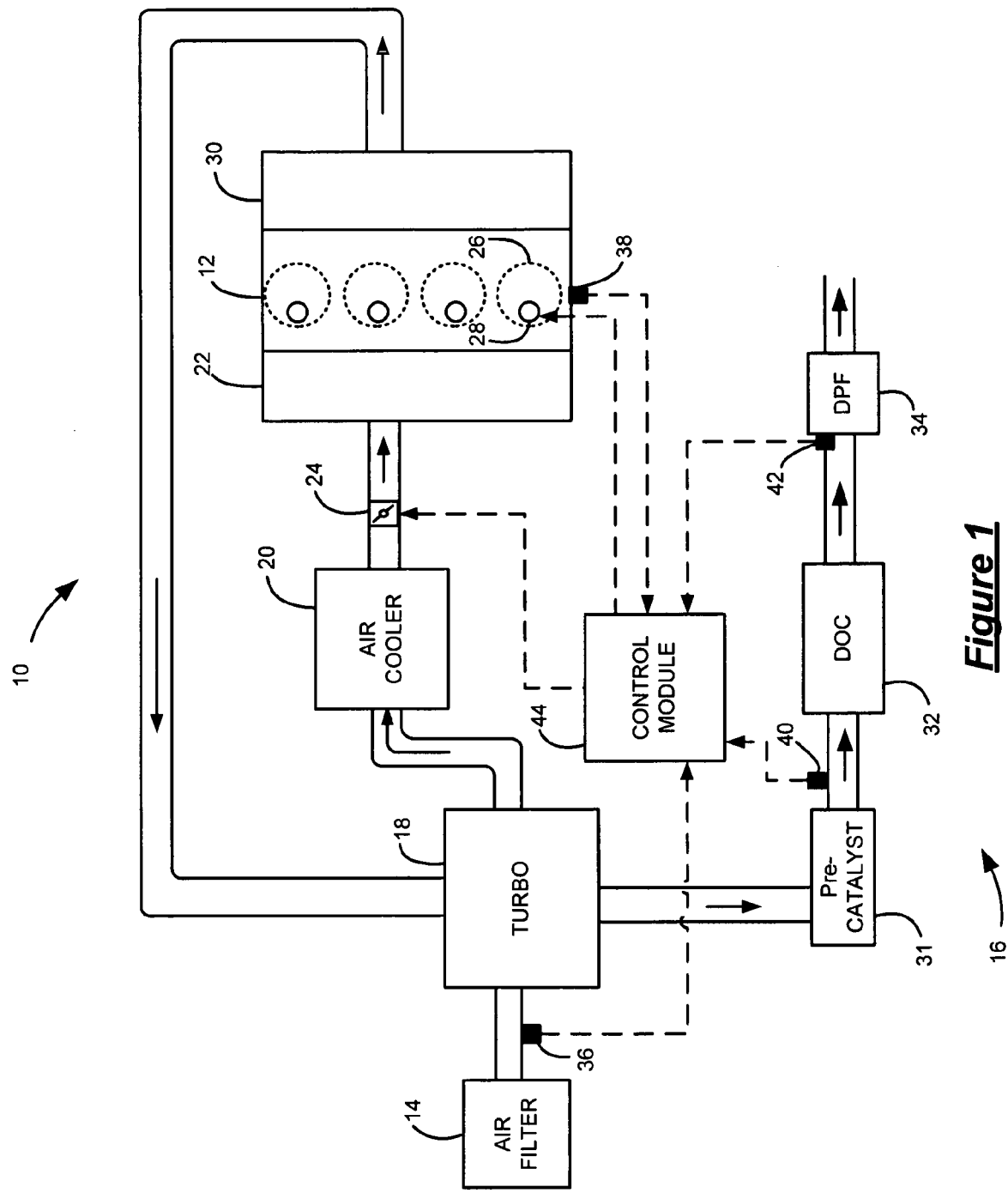
FIG. 1 is a schematic view of an exemplary diesel engine system that includes a diesel particular filter (DPF) regeneration system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combined logic circuit, and/or other suitable components that provide the described functionality.

Referring now to FIG. 1, a turbocharged diesel engine system 10 includes an engine 12 that combusts an air and fuel mixture to produce drive torque. Air enters the system by passing through an air filter 14. After passing through the air filter 14, air is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22. A throttle 24 controls the flow of air released into the intake manifold 22.

Air within the intake manifold 22 is distributed into cylinders 26. Although four cylinders 26 are illustrated, it is appreciated that the systems and methods of the present invention can be implemented in engines having a plurality of cylinders including, but not limited to, 2, 3, 4, 5, 6, 8, 10 and 12 cylinders. It is also appreciated that the systems and methods of the present invention can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a pre-catalyst 31, a diesel oxidation catalyst (DOC) 32, and a diesel particulate filter (DPF) 34. Optionally, an EGR valve (not shown) can re-circulate a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the pre-catalyst 31, the DOC 32, and the DPF 34 The DOC 32 oxidizes the exhaust based on the post combustion air/fuel ratio. The amount of oxidation increases the temperature of the exhaust. The DPF 34 receives exhaust from the DOC 32 and filters any soot particulates present in the exhaust.

A mass airflow (MAF) senor 36 measures the flow of air into the system and generates a MAF signal. An engine speed sensor 38 senses the speed of the engine in revolutions per minute (RPM) and generates a RPM signal. A temperature sensor 40 senses the temperature of the exhaust flowing out of the pre-catalyst 31 and generates a pre-catalyst outlet temperature signal. Alternatively, a temperature sensor 42 senses the temperature of the exhaust before it enters the DPF 34 and generates a DPF inlet temperature signal.

A control module 44 controls DPF regeneration based on the above mentioned signals. The control module estimates the amount of emitted soot particulates present the DPF 34. When control determines the DPF is full, control module initiates oxidation of the soot particulates present in the DPF by commanding a level of fuel and oxygen to be present in the exhaust.

DPF regeneration requires a DPF operating temperature of greater than 450 degrees Celsius. In order to maintain this operating temperature, control module 44 commands the fuel injectors 28 to inject fuel into the cylinders 26 during the exhaust phase. The process is also referred to as post injection (PoI). The additional fuel in the exhaust creates higher combustion temperatures in the DOC 32 thereby increasing the temperature of the exhaust that passes into the DPF 34. The control module 44 according to the present invention controls the level of airflow into the system and the PoI at a value and rate sufficient to prevent visible white smoke and objectionable odor.

Figure 2:
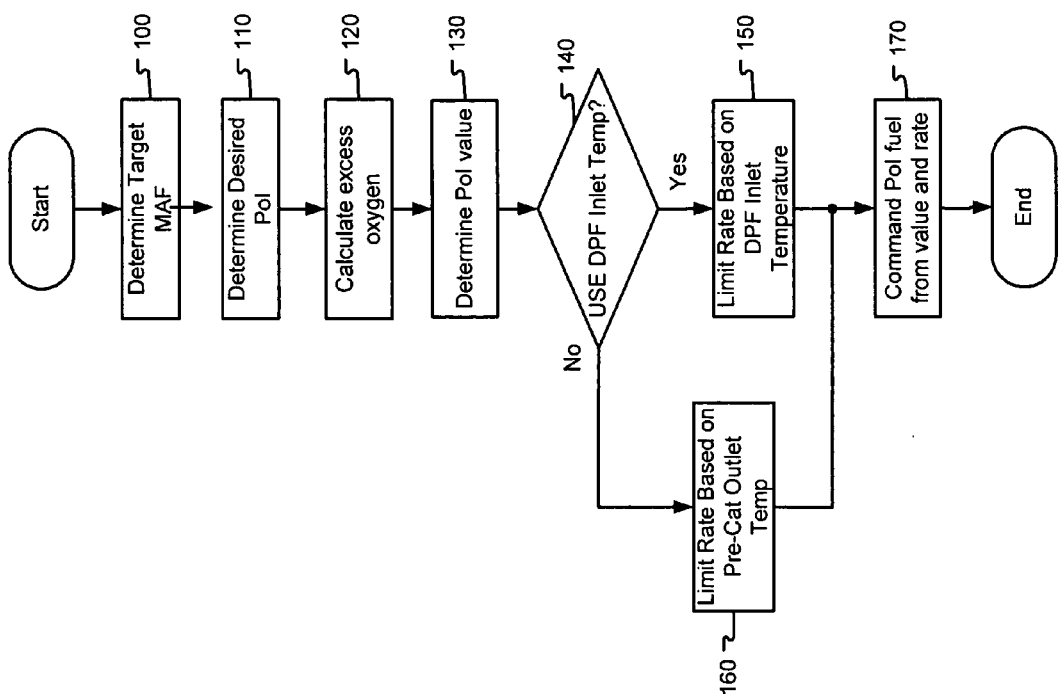
FIG. 2 is a flowchart illustrating the diesel particulate filter (DPF) enhanced post injection control according to the present invention.

Referring now to FIG. 2, a flowchart illustrates the steps performed by the control module for the enhanced post injection control method according to the present invention. In step 100, control determines a target MAF based on current engine operating conditions. In step 110, control determines a desired PoI value based on the target MAF of step 100. In step 120, a total fuel value is calculated based on the equation shown in FIG. 3. The total fuel value, TOT_FUEL, represents how much fuel can be injected into a cylinder 26 (FIG. 1) without reducing the PoI below a minimum. $O_2$_MIN represents a minimum level of oxygen that should be present in the exhaust to oxidize the PoI with five to ten percent excess oxygen for soot oxidation in the DPF 34 (FIG. 1). The minimum can be selectable. AFR represents a desired air/fuel ratio. CYL_NUM represents the number of cylinders 26 (FIG. 1) in the engine 12 (FIG. 1). RPM is the engine speed sensed from the engine 12 (FIG. 1). K is a constant optionally used to convert the equation to the proper units. And MAF is the mass airflow sensed by the MAF sensor 36 (FIG. 1).

Referring back to FIG. 2, in step 130, a PoI value is determined from a minimum of a calculated PoI for transient operating conditions and a calculated PoI for steady state operating conditions. A PoI for transient operating conditions, PoI_VALUE_TRNS, is calculated based on the calculated TOT_FUEL value of step 110 and the equation shown in FIG. 4. TRQ_FUEL represents the amount of fuel commanded to generate engine torque. And PoI_EFF represents the amount of PoI that will be burned in the cylinder 26 (FIG. 1), also known as the post injection efficiency. A PoI for steady state operating conditions, PoI_VALUE_SS, is set equal to the desired PoI determined in step 100 as shown in FIG. 5.

Referring back to FIG. 2, once the PoI value is determined, control can limit the rate at which fuel is injected based on a temperature of the exhaust. The DPF inlet temperature signal may be used in step 150 or the pre-catalyst outlet temperature signal may be used in step 160 to limit the rate at which fuel is injected. Once the value and rate is determined control commands PoI in step 170.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A post injection control system for regulating diesel particulate regeneration of a diesel particulate filter (DPF) with a diesel engine, comprising:
    a mass airflow sensor that generates a mass airflow signal;
    a temperature sensor that senses the temperature of exhaust and generates an exhaust temperature signal; and
    a control module that determines a post injection value based on transient engine operating conditions and that commands post injection at the post injection value determined from said mass airflow signal and at a post injection rate determined from said exhaust temperature signal.

2. The system of claim 1 wherein said control module determines a desired post injection value and commands post injection based on said desired post injection value during steady state engine operating conditions.

3. The system of claim 1 wherein said control module determines a desired post injection value and commands post injection based on said desired post injection value if said desired post injection value is less than said post injection value.

4. The system of claim 1 further comprising a pre-catalyst that receives exhaust including said post injection from said diesel engine and wherein said temperature sensor senses the temperature of exhaust exiting said pre-catalyst.

5. The system of claim 3 further comprising a diesel particulate filter that receives exhaust from said diesel engine wherein said diesel particulate filter oxidizes soot particulates trapped in said diesel particulate filter and wherein said temperature sensor senses the exhaust temperature entering said diesel particulate filter.

6. The system of claim 1 further comprising an engine speed sensor that senses a speed of said diesel engine and wherein said post injection value is determined from said mass airflow signal, said engine speed signal, a cylinder number, a desired air/fuel ratio, and a minimum oxygen value.

7. The system of claim 6 wherein said post injection value is further determined from a constant and wherein said constant can be selectable based on a desired unit.

8. The system of claim 6 wherein said minimum oxygen value is selectable based on an oxygen level required to oxidize all post injection while leaving excess oxygen for soot oxidation.

9. The system of claim 6 wherein post injection value is determined further from an engine torque fuel injection value and a post injection efficiency value.

10. A method of regulating post injection in a diesel engine for diesel particulate regeneration, comprising:
    determining transient operation of said diesel engine; and
    during said transient operation of said diesel engine:
        determining a mass airflow from a mass airflow sensor;
        determining a temperature of exhaust from a temperature sensor;
        determining a post injection value based on said mass airflow;
        determining a post injection rate based on said temperature; and
        commanding post injection according to said post injection value and said post injection rate.

11. The method of claim 10 further comprising:
    determining a target mass airflow;
    determining a desired post injection value based on said target mass airflow;
    controlling a throttle based on said target mass airflow; and
    commanding post injection according to said desired post injection value; and
    wherein said steps of controlling and commanding are performed during steady state operation of said diesel engine.

12. The method of claim 10 wherein said step of commanding post injection according to said desired post injection value is performed if said desired post injection value is less than said post injection value.

13. The method of claim 10 further comprising sensing and generating a temperature signal from exhaust flowing out of a diesel oxidation catalyst and wherein said step of determining said temperature includes determining said temperature of exhaust from said temperature signal.

14. The method of claim 10 further comprising sensing and generating a temperature signal from exhaust flowing into a diesel particulate filter and wherein said step of determining said temperature includes determining said temperature of exhaust from said temperature signal.

15. The method of claim 10 wherein said step of determining said post injection value further comprises determining a total fuel (TOT_FUEL) based on said mass airflow (MAF), a minimum oxygen value ($O_2$_MIN), an air/fuel ratio (AFR), a cylinder number (CYL_NUM), an engine speed (RPM), and a constant K according to the following equation:

$$\text{TOT\_FUEL}=\text{MAF}/(O_2\_\text{MIN}*\text{AFR}*\text{CYL\_NUM}*\text{RPM}*K).$$

16. The method of claim 15 wherein said step of determining said post injection value further comprises subtracting an engine torque fuel injection value (TRQ_FUEL) and post injection efficiency value (PoI_EFF) from said total fuel (TOT_FUEL) according to the following equation:

$$\text{PoI\_VALUE}=\text{TOT\_FUEL}-\text{TRQ\_FUEL}-\text{PoI\_EFF}.$$

17. A post injection control system for regulating diesel particulate regeneration of a diesel particulate filter (DPF) with a diesel engine, comprising:
    a mass airflow sensor that generates a mass airflow signal; and
    a control module that determines a post injection value based on at least one of transient engine operating conditions and steady state engine operating conditions and that commands post injection at the post injection value determined from said mass airflow signal.

* * * * *